(12) United States Patent
Jackson et al.

(10) Patent No.: US 6,631,740 B1
(45) Date of Patent: Oct. 14, 2003

(54) BRAZING JOINT FOR TUBES AND THE LIKE

(75) Inventors: Steve Jackson, Mark Center, OH (US); Richard Wermer, Hicksville, OH (US); Leo F. Beagle, Payne, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/983,364

(22) Filed: Oct. 24, 2001

(51) Int. Cl.[7] ................................................. F16L 9/14
(52) U.S. Cl. ...................... 138/109; 138/155; 138/177; 285/288.6; 285/332.4; 285/399
(58) Field of Search ................................ 138/109, 155, 138/177; 285/288.1, 288.6, 237, 332.4, 399

(56) References Cited

U.S. PATENT DOCUMENTS

| | | |
|---|---|---|
| 2,017,154 A | 10/1935 | Larkin |
| 3,500,538 A | 3/1970 | Raciti |
| 3,823,464 A | 7/1974 | Chartet |
| 4,576,325 A | 3/1986 | Maurice |
| 4,915,426 A * | 4/1990 | Skipper ....................... 285/286 |
| 5,082,070 A * | 1/1992 | Obermeier et al. ......... 285/286 |
| 5,160,090 A | 11/1992 | Friedrich et al. |
| 5,338,072 A * | 8/1994 | Bitter et al. ................ 285/286 |
| 5,511,831 A * | 4/1996 | Barton ....................... 285/382 |

* cited by examiner

*Primary Examiner*—James Hook
(74) *Attorney, Agent, or Firm*—Rader, Fishman & Grauer PLLC

(57) ABSTRACT

A first tube has an end portion with a socket that is tapered by, a frustoconical wall that ends with a radially extending land. A copper brazing ring is disposed on the land. An end portion of a second tube having a knurled surface is press fitted into the socket to provide a coupling assembly. Upon heating the coupling assembly, the copper brazing ring melts and flows through the grooves in the knurled surface to weld the second tube to first tube and to seal the interface therebetween.

19 Claims, 2 Drawing Sheets

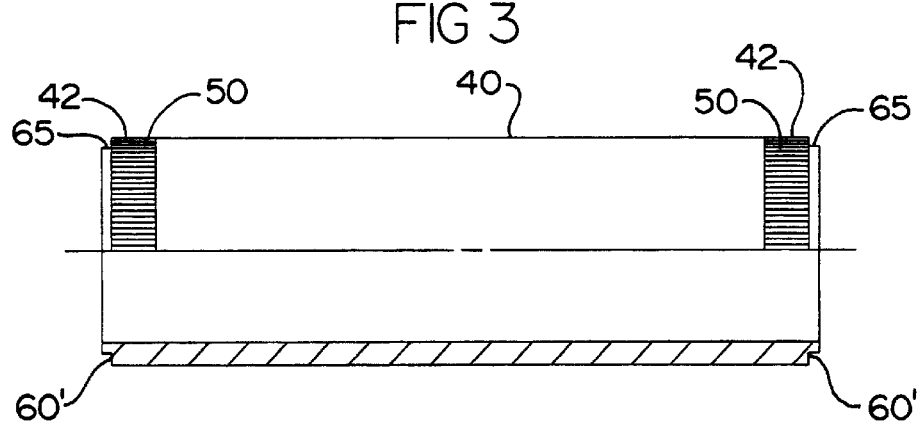
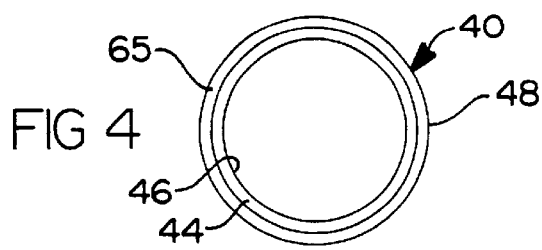
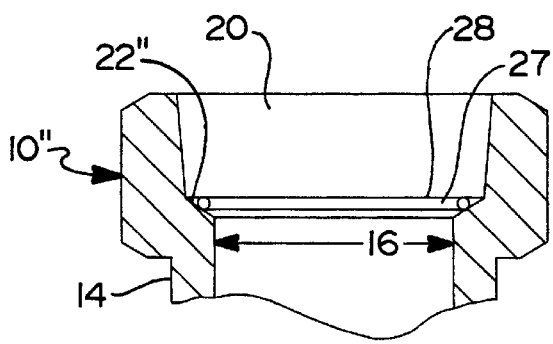

BRAZING JOINT FOR TUBES AND THE LIKE

FIELD OF THE INVENTION

The present invention is directed to brazed joints and the like wherein two members are coupled to one another with the coupling being secured by a brazing material such as copper. More particularly, the present invention is directed to, but not limited, to joining tubular members to one another or to other members such as fittings.

BACKGROUND OF THE INVENTION

There is a constant need to provide reliable couplings for devices such as metal tubes, wherein the couplings are relatively inexpensive and can withstand mechanical stress due to vibration, heat, impact, compression and tension. In addition, it is necessary that the couplings withstand chemical corrosion. Many high pressure joints require lengths of tubing which are made of steel and do not have a requirement that tubing be separated during operational life. It has become customary to utilize copper brazing to bond such materials, however the lengths of joints necessary for high pressure couplings have increased to the extent that copper flow in the joints is occasionally impeded. Consequently, tubes which have been joined with copper brazing not infrequently require reprocessing. This concern has raised questions of product integrity, making it difficult to determine if tube couplings are sound without destructive testing. Accordingly, there is a need for reliable couplings which are relatively easy to assemble and are forgiving with respect to deviations in shape and surface quality, so that reliability is not compromised by frequently occurring anomalies.

SUMMARY OF THE INVENTION

In view of the above and other concerns, the present invention is directed to a joint between first and second metal members wherein the first metal member includes a socket which receives the second metal member. An inwardly tapered wall defines a frustoconical space in the socket of the first member, while an annular base within the socket defines the end of the socket and supports brazing material. At least one of the members has a knurled portion which frictionally retains the end of the first metal member within the socket and to provide paths for the brazing material as the joint is heated to liquefy the brazing material so as to allow the brazing material to flow along the grooves. When the brazing material solidifies, the first and second metal members are permanently coupled to one another.

In further aspects of the invention, the first and second metal members are steel tubes and the brazing material is configured as a copper ring.

BRIEF DESCRIPTION OF THE INVENTION

Various other features and attendant advantages of the present invention will be more fully appreciated as the same becomes better understood when considered in conjunction with the accompanying drawings, in which like reference characters, primed or unprimed, designate the same or similar parts throughout the several views, and wherein:

FIG. 3 is a partial side elevation of a second tube having opposite ends configured with knurled portions in accordance with the principles of the present invention;

FIG. 4 is an end view of the tube of FIG. 3; and

FIG. 5 is a side view of alternative end structure for the tubes of FIGS. 1–4.

DETAILED DESCRIPTION

Figure 1A:
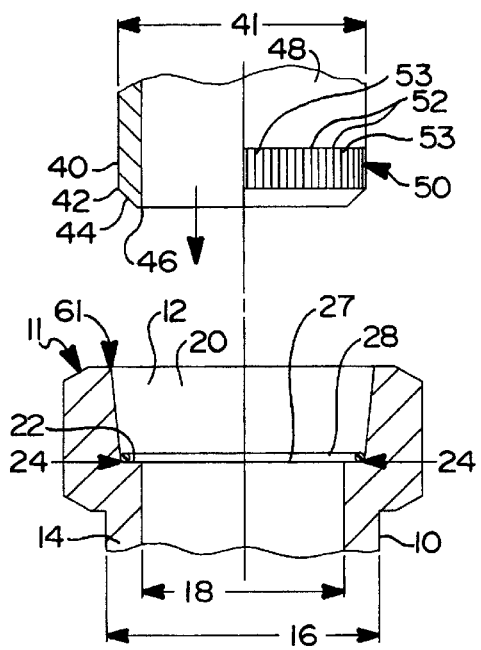
FIG. 1A is an exploded side view of a first embodiment of the invention, mostly in elevation, showing an end of a first tube positioned to receive an end of a second tube in accordance with methods of present invention.
Figure 1B:
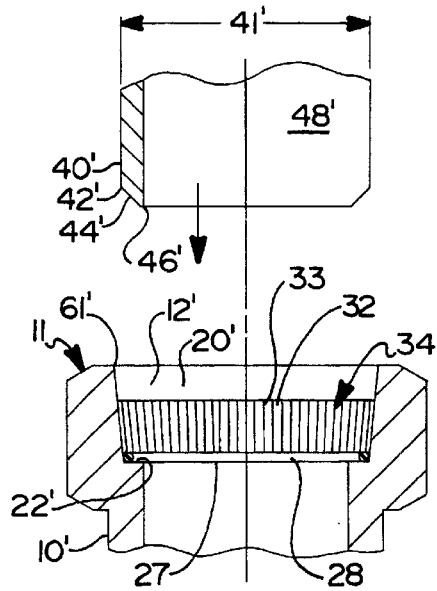
FIG. 1B is similar to FIG. 1A but illustrating a second embodiment of the invention.

Referring now to FIGS. 1A and 1B where the numerals of FIG. 1B which are similar to the numerals of FIG. 1A are primed, there is shown a first metal member in the form of a tube 10 having and end portion 11 configured as a socket 12 which is in the form of a size tapered counterbore. The end portion 11 is unitary with the axially extending portion 14 of the first tube 10 and has been formed with an outside diameter 16 greater than the outside diameter 18 of the elongated portion 14 of the tube 10.

The socket 12 has a frustoconical wall 20 which terminates in a land 22 at the base of the socket. Land 22 has a major diameter 24 which is greater than the internal diameter 18 of the elongated portion 14 and provides a shelf which supports brazing material 27. In a preferred embodiment of the invention, the brazing material 27 is in a form of a copper brazing ring 28.

In the embodiment of FIG. 1A, the frustoconical wall 20 of the socket 12 is smooth, whereas in the embodiment of FIG. 1B the frustoconical wall 20' of the socket 12' has an annular portion which has a plurality of axially extending grooves 32 which define ridges 33 to provide a knurled band 34 beginning at the land 22'.

As is seen in FIG. 1A, a second metal member is in the form of a tube 40 has an end portion 42 which is aligned for receipt in the socket 12. In a preferred embodiment, the end portion 42 has a frustoconical or beveled tip 44 extending to a narrow end edge 46. Extending axially from just beyond the frustoconical portion 44 on the cylindrical surface 48 of the second tube 40 is knurled band 50 formed of a plurality of axially extending grooves 52 defining ridges 53. The lengths of the grooves 52 and ridges 53 are less than the height of the socket 12.

In the second embodiment shown in FIG. 1B, the second tube 40' does not have a knurled portion 50 because knurled portion 34 of the socket 12' provides the grooves 32 and ridges 33 which have a function corresponding to the function of the grooves 52 and ridges 53 in the second tube 40 of FIG. 1.

Figure 2A:
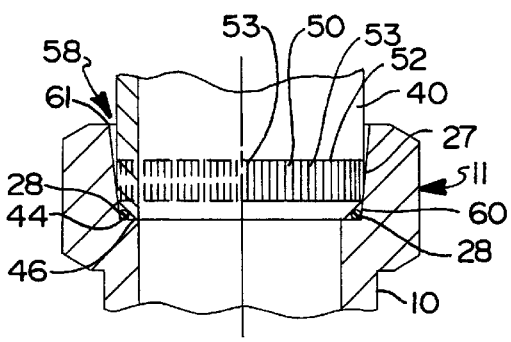
FIG. 2A is a side elevation of the first embodiment of the invention showing the end portion of the second tube received in a socket of the first tube and brazed to make a permanent coupling.
Figure 2B:
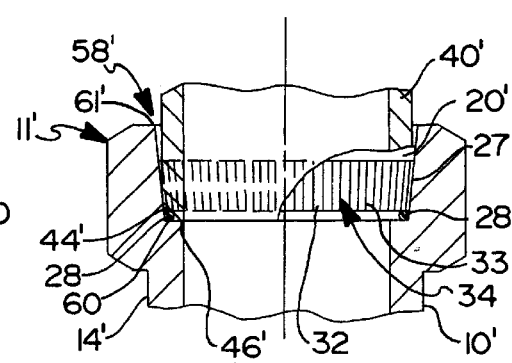
FIG. 2B is a side elevation of the second embodiment of the invention which is similar to FIG. 2A, with a portion of one tube broken away.

Referring now to FIGS. 2A and 2B, the end 42 and 42' of the second tubes 40 and 40' are pushed into the sockets 12 and 12'. Since the walls 20 and 20' are frustoconical and the outside diameters 41 and 41' of the second tubes 40 and 40' are less than the inside diameters 25 and 25' of the sockets 12 and 12', the second tubes press fit easily within the sockets and engage with frustoconical walls in interference fit. In FIG. 2A the knurled portion 50 of the tube 4 frictionally engages the smooth frustoconical wall 20 of the socket 12. In FIG. 2B, the knurled portion 34 frictionally engages the smooth end surface 42' of the inserted tube 40'of the tube 10'.

In an exemplarily embodiment of FIGS. 1A and 2A, the tapor of the socket 12 is approximately 1° which is sufficient to provide a locking tapor that prevents the tube 40 from falling out of the socket while allowing the end 42 of the second tube to easily enter the socket 12, even if the second tube or the socket 12 are slightly out of round or have minor surface imperfections. The tapor allows for larger outside diameter variation for the second tube 40. As the tube 40 is inserted into the socket 12, the tapor of the socket allows the memory of the material to secure the tube with the socket which minimizes the gap between the tube and socket and improves the strength of the joint.

The knurled band 50 has an axially length which is approximately 50% of the depth of the socket 12 while the height of the ridges 53 comprising the knurled band 50 is about 0.003 inch. As the tube 40 enters the socket 12, the knurled band 50 scores the smooth frustoconical surface 20 of the socket 12 resulting in improved capillary action which allows more time for the copper brazing material 27 to penetrate in to the base metal of the tube 40 and socket 12.

As is seen in FIG. 2A, the copper ring 28 is retained in a space 60 provided by the beveled end 44 of the second tube 40 to provide a pre-brazing assembly 58. Upon heating the assembly 58 as shown in FIG. 2A, the copper brazing ring 28 melts and migrates through the grooves 52 of the knurled band 50 in the second tube 40 in order to both seal the coupling with a metal seal and to weld the second tube 40 to the first tube 10 at an interface fit within the socket 12. Moreover, the copper brazing material 27 is visible at the mouth 61 of the socket 12 defining the top of the joint providing a visible indication that the joint is sound.

Referring now to FIG. 2B, in FIG. 2B the grooves 32 in the knurled portion 34 of the socket 12' allow migration or flow of liquid copper between the frustoconical wall 20' and the smooth end surface 42' of the second tube 40' to seal and fix the second tube 40' to the first tube 10 upon the copper solidifying. Accordingly, both embodiment FIG. 2A and 2B provide simple reliable joints for joining not only metal members such as the first and second tubes 10 and 40 respectively, but for joining solid bars or projections of any sort into sockets. However a preferable arrangement of the present invention is for joining steel tubes used for conveying pressurized hydraulic fluids, such as brake fluids.

Generally in both embodiments of the invention, the locking tapor of about 1° allows the memory of the steel comprising tubes 10 and 40 to retain a tighter fit through the brazing operation while allowing for greater tolerances in the components being joined. Out of round tubes 40 or 40' and or sockets 12 or 12' without galling or tearing of the base metals comprising the adjoining steel surfaces can therefore be joined. The knurled bands 50 and 34 generate minute flow paths in the sockets 12 and 12' and in the tubing 40 and 40', enhancing capillary action which reduces the time for copper brazing material 27 to flow through the joints and provide a visible copper rings at the top of the joint with a single pass through the furnace. Moreover, the knurled portions generate a larger bonding surface for the copper to penetrate into the steel of the sockets 12 and 12' and the tubes 40 and 40' while cooperating with the tapor to allow assembly with less force.

Referring now to FIGS. 3 and 4, there is shown the tube 40 having similar first and second opposite end portions 42. The end portions 42 each have a knurled portion 50 defined by grooves 52, but instead of having a frustoconical or beveled end portions 44, the end edges 46 have an annular notch 65 which cooperates with the land 22 in the socket upon assembling the second tube 40 with the first tube 10. The notch 65, like the beveled end 44 of FIGS. 1 and 2, provides a space 60' that accommodates the copper brazing ring 28.

Referring now to FIG. 5 where a third embodiment 10" of the first tube is shown, it is seen that land 22" is frustoconical or beveled at an oblique angle preformed by a drill point, rather than being flat so as to extend perpendicular to the axis of the tube, as is the case in FIGS. 1 and 2. Since the land 22" of FIG. 5 is wider than the diameter 26 of the bore of the first tube 10 the land 22' is sufficiently wide to support copper brazed ring 28.

From the foregoing description, one skilled in the art can easily ascertain the essential characteristics of this invention, and without departing form the spirit and scope thereof, can make various changes and modifications of the invention to adapt it to various usages and conditions.

We claim:

1. A joint between first and second metal members, the first metal member including a socket which receives the second metal member, the joint comprising:

an inwardly tapered wall defining a frustoconical space in the socket of the first member, the inwardly tapered wall receiving thereagainst an outer wall of the second metal member;

a land within the socket extending radially inwardly at the narrow end of the frustoconical space; and a knurled portion on at least one of the members, and brazing material disposed between the first and second members, the brazing material having flowed through the knurled portion from a ring of brazing material abuttingly positioned between the land within the socket and an end of the second member.

2. The joint of claim 1 wherein the land extends perpendicular to the axis.

3. The joint of claim 1 wherein the land extends obliquely with respect to the axis.

4. The joint of claim 1 wherein the first and second members are tubes.

5. The joint of claim 1 wherein the knurled portion is in the second member adjacent to an end thereof.

6. The joint of claim 5 wherein the knurled portion is spaced from the end of the second member by an unknurled portion of a smaller outside diameter than the outside diameter of the knurled portion.

7. The joint of claim 5 wherein the unknurled end portion is frustoconical.

8. The joint of claim 5 wherein the unknurled portion is an annular notch.

9. The joint of claim 1 wherein the knurled potion is in the inwardly tapering wall defining the frustoconical space of the socket in the first member.

10. The joint of claim 1 wherein the first and second members are made of steel.

11. A joint between first and second metal tubes, the first tube including a socket which receives the second tube, the joint comprising:

an inwardly tapered wall defining a frustoconical space in the socket of the tube, the inwardly tapered wall matingly receiving thereagainst an outer wall of the second metal tube;

an annular land within the socket extending radially inwardly at the narrow end of the frustoconical space;

a knurled portion on at least one of the mating walls of the tubes; and brazing material disposed between the first and second tubes, the brazing material having flowed through the knurled portion from a ring of brazing material abuttingly positioned between the land within the socket and an end of the second tube received in the socket.

12. The joint of claim 11 wherein the land extends perpendicular to the axis.

13. The joint of claim 11 wherein the land extends obliquely with respect to the axis.

14. The joint of claim 11 wherein the knurled portion is in the second tube adjacent to an end thereof.

15. The joint of claim 11 wherein the knurled portion is spaced from the end of the second tube by an unknurled portion of a smaller outside diameter than the outside diameter of the knurled portion.

16. The joint of claim 11 wherein the unknured end portion is frustoconical.

17. The joint of claim 11 wherein the unknurled end portion is an annular notch.

18. The joint of claim 11 wherein the knurled portion is in the inwardly tapering wall defining the frustoconical space of the socket in the first tube.

19. The joint of claim 11 wherein the first and second tubes are made of steel.

* * * * *

UNITED STATES PATENT AND TRADEMARK OFFICE
CERTIFICATE OF CORRECTION

PATENT NO.   : 6,631,740 B1  Page 1 of 1
DATED        : October 14, 2003
INVENTOR(S)  : Steve Jackson et al.

It is certified that error appears in the above-identified patent and that said Letters Patent is hereby corrected as shown below:

Column 6,
Line 1, change "unknured" to -- unknurled --.

Signed and Sealed this

Thirteenth Day of January, 2004

JON W. DUDAS
*Acting Director of the United States Patent and Trademark Office*